Jan. 22, 1957  L. REYMOND  2,778,272
OPTICAL OBJECTIVE SYSTEM DEVICE OF VARIABLE FOCAL LENGTH
Filed May 3, 1954

INVENTOR
Lucien Reymond
BY
Cameron, Kerkam & Sutton
ATTORNEYS

United States Patent Office 2,778,272
Patented Jan. 22, 1957

2,778,272

OPTICAL OBJECTIVE SYSTEM DEVICE OF VARIABLE FOCAL LENGTH

Lucien Reymond, Paris, France, assignor to Société d'Optique et de Mecanique de Haute Precision, Paris, France, a corporation of France Application May 3, 1954, Serial No. 427,117

Claims priority, application France May 13, 1953

9 Claims. (Cl. 88—57)

The present invention, relates to optical devices for obtaining from a given object a clear image situated in a plane which remains substantially fixed, although the size of the image may be progressively varied between two predetermined limits by a suitable displacement of the elements of the device.

In known devices, this problem is solved by the use of two lenses situated on either side of a fixed lens and which can be moved as a unit to cause the size of the image to vary. In these devices, the plane of the object is at infinity and that of the image at a finite distance and, by suitable choice of the powers of the lenses, the image plane is caused to pass three times through the same position when the movable lens unit is brought from one of its extreme positions to the other. The displacement of the image plane then remains very small.

However, where it is necessary that the image plane be very precisely located, the approximation obtained by means of the known devices of the above-mentioned type is inadequate if it is also desired that the size of the image be variable within wide limits.

The invention allows the amplitude of the displacement of the image plane for a given range of variation of the size of the image to be reduced, while employing a lens system similar to that which has been referred to above.

The device in accordance with the invention comprises two lenses which are movable as a unit and have a fixed lens interposed between them as in the earlier devices but the focal lengths of the three lenses are calculated so that with the object and image planes both situated at finite distances, the image planes passes four times through the same position while the movable lens system is being displaced from one extreme position to the other.

This result cannot be obtained with the known arrangements, for which one of the above-mentioned planes is situated at infinity.

It can be of special interest in practice that when the movable lens unit is in its mean position, the object and image planes are disposed strictly symmetrically with respect to the fixed intermediate lens. This can be achieved by giving the two movable lenses the same focal length.

The fact that the image plane passes four times through one point enables the displacement of the image plane to be considerably reduced for an equal ratio between the extreme sizes of the image and for an equal total travel of the lenses.

The invention will now be described with reference to particular embodiments given by way of example and illustrated in the drawings in which.

Figure 1:
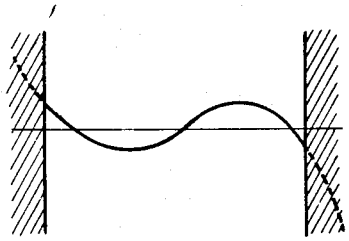
Figure 1 shows the curve obtained by plotting as abscissae the translation T to which the movable lens unit is subjected and as ordinates the displacement D of the image plane with respect to its mean position, in the case of a known arrangement.

It will be seen that the curve in Figure 1 intersects the abscissae axis at only three points and departs materially from that axis between the points of intersection.

Figure 2:
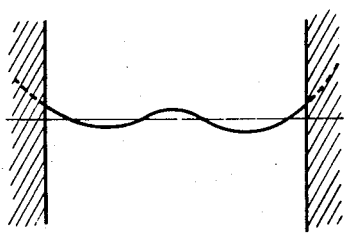
Figure 2 shows a similar curve in the case of a device according to the invention.

In Figure 2, however, the curve intersects the abscissae axis at four points and always remains close to that axis.

Figure 3:
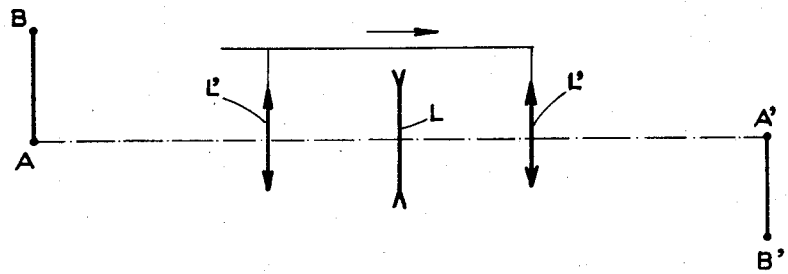
Figure 3 shows diagrammatically an arrangement, according to the invention.

Figure 3 shows a three-lens system L'—L—L' comprising two movable lenses L', L' of the same focal length and a fixed lens L. The movable lenses are shown in their mean position, that is to say, the position in which they are equidistant from the fixed lens.

In this mean position of the system, the object AB and its inverted image A' B' are situated in planes which are equidistant from the fixed lens L, and are of the same size.

For the determination of the focal lengths of the three lenses and the position of the object plane required for a predetermined value of the ratio of the extreme sizes of the image A' B' (i. e. the sizes of the image when one or the other of the two lenses L' is in contact with the fixed lens L), that ratio can be given the absolute value $g$ or its reciprocal $$\frac{1}{g}$$

according to whether the image is to be at its largest or smallest when a particular one of the lenses is at one end or the other of its travel.

Also, one can take as the unit of length half the distance between the two movable lenses, so that the device can be designed on any arbitrary scale.

Having adopted this convention for the unit of length, let $f$ be the focal length of the middle lens L and $f'$ the common focal length of the two movable lenses L', L', these quantities being algebraic and being positive when the lenses are convergent. Also, let $a$ be the abscissa of the object plane with respect to the fixed lens L, assuming $a$ to be negative when the object plane is positioned in front of the lens in the direction of travel of the light (as in the case of the real image shown in Figure 3).

In the following, $k$ will designate the ratio defined by:

$$k = \frac{-\sqrt{g}-1}{-\sqrt{g}+1}$$

It may be established and it is easy to verify numerically that a system having the desired characteristics is obtained by adopting for $f$, $f'$ and $a$, values which satisfy the relations indicated below or which are very close thereto, viz: $f$ is one of the solutions of the equation:

$$8f^3 - 8f^2 - (4k^2-6) - (k-2)(k^2-1) = 0 \qquad (1)$$

Having chosen for $f$ one of the solutions of this equation, $f'$ and $a$ are derived therefrom by the formulae:

$$f' = \frac{(2f+k)(1-k)}{2f+k-2} \qquad (2)$$

$$a = 2f+k-2 \qquad (3)$$

Formula 3 governs the ratio $g$ between the extreme sizes of the image. Formulae 1 and 2 must be satisfied in order that the image plane may pass four times through one single position.

From a consideration of these formulae it is apparent that their solution provides the advantage of the image plane passing four times through the same substantially fixed position only when the distance between the object plane and the fixed lens and between the image plane and the fixed lens is less than approximately ten times the distance between the two movable lenses.

In actual fact, it is possible to depart very slightly from the values of $f$, $f'$ and $a$ and even to introduce a very small difference between the focal lengths of the two movable lenses. These variations slightly modify the shape of the curve shown in Figure 2, but if they are sufficiently small, the image plane will still pass four times through a single position. Moreover, in practice, it is very difficult to provide lenses having focal lengths which are strictly the same and equal to the values of $f$ and $f'$. This, however, need not result in any difficulty as any disparity which exists can be compensated if an adjustment is provided for the spacing of the two movable lenses and also an adjustment of the position of the object plane.

By way of numerical example, let it be assumed that a ratio of $g=3.0625$ is to be obtained between the extreme sizes of the image.

Then
$$\sqrt{g}=1.75$$
and
$$k=\frac{-1.75-1}{-1.75+1}=\frac{11}{3}$$

Using those values for the solution of equation (1) and choosing that root which has the largest absolute value, because it leads to the most favourable construction, one obtains:

$$f=3.15409;\ f'=-3.33543;\ a=7.97485$$

The fixed central lens is then convergent and the two movable lenses divergent. The object is virtual, since it must be placed beyond the system with respect to the direction of travel of the light and it must, therefore, be the image given by an optical device situated in front of the system.

The same ratio between the extreme sizes of the image can be obtained by giving $g$ the value of the reciprocal of previously chosen value, namely, $$g=\frac{1}{3.0625}$$

for which
$$\sqrt{g}=\frac{1}{1.75}=\frac{4}{7}$$

In that case,
$$k=\frac{-4-7}{-4+7}=\frac{-11}{3}$$

and, Equation 1 admitting of only one root, $$f=-2.60033;\ f'=3.80782;\ a=-10.86733$$

This time, the central lens is divergent, the two movable lenses convergent and the object is real. This is the arrangement which is shown in Figure 3.

It is also possible to have other solutions, by changing the sign of $$\sqrt{g}$$

that is to say, by taking:

$$k=\frac{\sqrt{g}-1}{\sqrt{g}+1}$$

Then, however, the focal lengths of the lenses are of small absolute value and are much less favourable.

Obviously, the lenses constituting the system may be simple or compound, or may be replaced by more complex groups of lenses.

In actual fact, when account is taken of the thicknesses of the lenses, the distances between them must be calculated, as is known, from the main image plane of each of them to the main object plane of the following lens. These planes are generally within the glass, so that it is, in practice, impossible to reduce to zero the distance between the central lens L and one or other of the lenses L'. The result is that the total travel of the movable unit is always a little smaller than that which has been assumed in the preceding calculations, these having been made on the assumption of infinitely thin lenses. In these circumstances, operating as stated above, it will not be possible to obtain the ratio which has been fixed between the extreme sizes of the image. However, it is easy to evade the difficulty by making the calculation for a value of this ratio which is slightly higher than that which it is desired to obtain. The equations given above then require no modification.

The optical system which forms the subject of the invention is capable of numerous applications. It may, for example, be used by itself for forming an image of variable size from a real object, which image may, if desired, be received directly on a photographic plate.

It is also possible for the system to be incorporated in an optical instrument such as a telescope, in which it functions as an image carrier providing the possibility of progressive enlargement of the image. For that purpose, it must be made so that the image supplied by the optical device in front of the system is formed in the plane which serves the purpose of object with respect to the latter.

One of the most interesting applications is the use of the system in photography or cinematography as a picture taking objective of variable focal length. As such an objective must be able to operate at infinity, it is sufficient to place a supplementary lens in front of the system, the image focal plane of that lens coinciding with the plane which serves the purpose of object in relation to the said system. A real final image which may be received on the plate or film can be obtained if it is arranged that the object plane which corresponds to the image is placed in front of the system. It is then advisable for the supplementary lens to be divergent. This lens may serve to adjust the focusing at a finite distance by arranging for it to be movable along the optical axis.

In all the applications of the invention, it is possible to reduce the displacement of the image plane still further by positioning at the rear of the system a lens (or lens assembly) which reduces the size of the image N times. It is known that, under these conditions, the longitudinal displacement of the final image is $N^2$ times smaller than that of the initial image. This expedient makes the system even more suitable for use as a picture-taking objective of the kind described above. In this case, it is immaterial whether the plane serving as the object with respect to the system is situated in front or behind, because with either arrangement, it is always possible to arrange that the lens or lens assembly which follows it gives a real final image. According to the solution adopted, the lens at the front of the system will be divergent or convergent.

Figure 4:
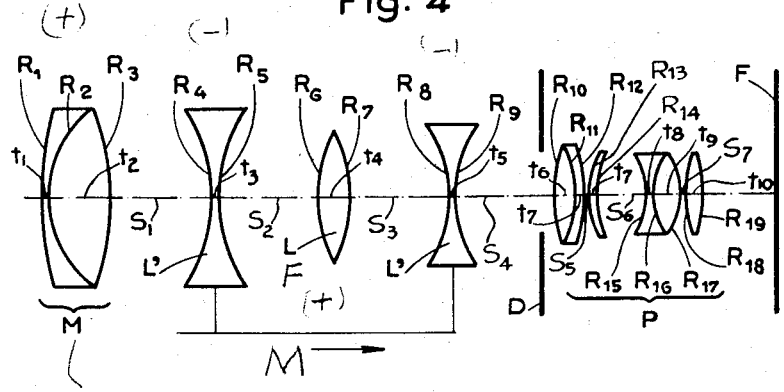
Figure 4 shows largely diagrammatically and in greater detail a modified construction of the arrangement according to the invention.

As an example of an embodiment of a device in accordance with the invention. Figure 4 shows a cinematograph picture-taking objective, the focal length of which may vary between 17.5 and 70 millimetres, that is, a ratio of 4 between the extreme sizes of the image. The system comprises a central convergent lens L, on each side of which is placed one of the two divergent lenses L' which are interconnected to form the movable unit which is here shown in its mean position. Located in front of the system is the achromatic convergent lens M, the image focal plane of which coincides with the plane serving the purpose of object with respect to the system. It is this lens which is displaced along the optical axis in order to effect the correct focusing at finite distances.

Finally, following the system, a group of lenses P is provided, which produces from the virtual image formed by the said system, a final real image which is 3.8 times smaller on the film F. In this example, the half-distance between the two movable lenses L', which has been taken as the unit in establishing the equations for infinitely thin lenses, has a value of 20 mm. The effective travel of the movable lenses is ±15 millimetres with respect to their mean position. The displacement of the image plane does not exceed $$\pm \frac{1}{100}$$

of a millimetre. A diaphragm D is placed between the last movable lens L' and the lens group P so that throughout the range of adjustment of the focal length of the objective thus formed, its relative aperture does not change for a specified diaphragm diameter.

The constructional data of this objective appear in the following table. The first column indicates the numerical values of the successive radii of curvature $R_1$, $R_2$, $R_3$ etc. . . . indicated in Figure 4; the second column indicates the thicknesses of the glass $t_1$, $t_2$, $t_3$, etc. or air spacing $s_1$, $s_2$, $s_3$, etc. which separate the lenses. Columns 3 and 4 relate to the characteristics of the glasses, that is to say, the refractive indices N and reciprocals of the dispersive powers V.

| Radii of Curvature, mm. | Thicknesses of glass and air, mm. | $n_D$ | Reciprocal of Dispersive Power |
|---|---|---|---|
| $R_1=+90$ | $t_1=2$ | $N_1=1.64808$ | $V_1=34$ |
| $R_2=+33$ | $t_2=14$ | $N_2=1.51461$ | $V_2=54.3$ |
| $R_3=-120.37$ | $s_1=11.0213$ to $41.0213$ | | |
| $R_4=-60$ | $t_3=2.0162$ | $N_3=1.62003$ | $V_3=56.2$ |
| $R_5=+39.5077$ | $s_2=34.5098$ to $4.5098$ | | |
| $R_6=+43.8437$ | $t_4=7.4236$ | $N_4=1.54877$ | $V_4=52.3$ |
| $R_7=-43.8437$ | $s_3=4.5098$ to $34.5098$ | | |
| $R_8=-39.5077$ | $t_5=2.0162$ | $N_5=1.62003$ | $V_5=56.2$ |
| $R_9=+60$ | $s_4=38.8617$ to $8.8617$ | | |
| $R_{10}=+118.376$ | $t_6=4.8$ | $N_6=1.51461$ | $V_6=54.3$ |
| $R_{11}=-31.81$ | $t_7=1.9$ | $N_7=1.64808$ | $V_7=34$ |
| $R_{12}=-86.76$ | $s_5=0.5$ | | |
| $R_{13}=+30.5503$ | $t_7=2.7227$ | $N_8=1.60574$ | $V_8=44$ |
| $R_{14}=+176.735$ | $s_6=11.2745$ | | |
| $R_{15}=-18.6757$ | $t_8=2.9095$ | $N_9=1.71105$ | $V_9=30$ |
| $R_{16}=+22.3672$ | $t_9=7.0011$ | $N_{10}=1.54094$ | $V_{10}=48$ |
| $R_{17}=-19.1848$ | $s_7=0.7274$ | | |
| $R_{18}=+50.0079$ | $t_{10}=4.1825$ | $N_{11}=1.65878$ | $V_{11}=51.1$ |
| $R_{19}=-50.0079$ | | | |

The mean position of the image plane is 29.465 millimetres from the last lens.

All the lengths indicated are in millimetres.

What I claim is:

1. In an optical device, a fixed lens, a substantially fixed object plane located at a finite distance from said fixed lens, an image plane substantially fixed at a finite distance from said fixed lens, said object plane and said image plane being substantially coaxial with said fixed lens, a movable coaxial lens on each side of said fixed lens movable as a unit and substantially fixed in distance apart one from the other, said movable lenses having substantially equal focal lengths, the distances between said fixed lens and said object plane and between said fixed lens and said image plane not exceeding approximately ten times the distance between said movable lenses, and said fixed lens being located substantially symmetrically with respect to said object plane and to said image plane, whereby as said movable lenses are moved from one extreme position to their other extreme position the image plane passes four times through the same position with reduced displacement thereof.

2. An optical device as described in claim 1 including an optical system, the image focal plane of which coincides with said object plane.

3. An optical device as described in claim 1 including a supplementary optical system between said image plane and the adjacent lens of said movable lenses reducing the image falling on said image plane.

4. An optical device as described in claim 1 including an optical system the image focal plane of which coincides with said object plane and including a supplementary optical system between said image plane and the adjacent lens of said movable lenses reducing the image falling on said image plane.

5. In an optical device, a fixed lens having a focal length $f$ determined by the equation $$8f^3 - 8f^2 - f(4k^2-6) - (k-2)(k^2-1) = 0$$

a substantially fixed object place located at a finite distance from said fixed lens, an image plane substantially fixed at a finite distance $a$ from said fixed lens determined by the equation $a=2f+k-2$, said object plane and said image plane being substantially coaxial with said fixed lens, a movable coaxial lens on each side of said fixed lens movable as a unit and substantially fixed in distance apart one from the other, said movable lenses being of equal power, the unit of length for the device being one half the distance between said movable lenses, said movable lenses having substantially equal focal lengths $f'$ determined by the Equation $$f' = \frac{(2f-k)(1-k)}{2f+k-2}$$

$k$ equaling $$\frac{-\sqrt{9}-1}{-\sqrt{9}+1}$$

where $g$ is the ratio between the extreme sizes of the image, the distances between said fixed lens and said object plane and between said fixed lens and said image plane not exceeding approximately ten times the distance between said movable lenses, and said fixed lens being located substantially symmetrically with respect to said object plane and to said image plane, whereby as said movable lenses are moved from one extreme position to their other extreme position the image plane passes four times through the same position with reduced displacement thereof.

6. An optical device as described in claim 5 including an optical system the image focal plane of which coincides with said object plane.

7. An optical device as described in claim 5 including a supplementary optical system between said image plane and the adjacent lens of said movable lenses reducing the image falling on said image plane.

8. An optical device as described in claim 5 including an optical system the image focal plane of which coincides with said object plane and a second optical system between said image plane and the adjacent lens of said movable lenses reducing the image falling on said image plane.

9. In an optical system comprising a fixed convergent lens disposed between two movable divergent lenses integrally connected for displacement together along the optical axis without substantial change in the distance between them, an object plane at a finite axial distance from said fixed lense, an image plane at a finite axial distance from said fixed lens, a lens system the image focal plane of which coincides with said object plane, and a second lens system between said image plane and the adjacent lens of said movable lenses reducing the image falling on the image plane having optical characteristics of the following order wherein R is the radii of the lens refracting surfaces, $t$ is the axial thickness of the lens elements, $s$ is the axial spacing of the lens elements, $N$ is the refractive index of the several lens materials, and $V$ is the reciprocal of the dispersive power of the several lens materials, the optical system having a focal length between 17.5 and 70 mm.:

| Radii of Curvature, mm. | Thicknesses of glass and air, mm. | $n_D$ | Reciprocal of Dispersive Power |
|---|---|---|---|
| $R_1=+90$ | $t_1=2$ | $N_1=1.64808$ | $V_1=34$ |
| $R_2=+33$ | $t_2=14$ | $N_2=1.51461$ | $V_2=54.3$ |
| $R_3=-120.37$ | $s_1=11.0213$ to $41.0213$ | | |
| $R_4=-60$ | $t_3=2.0162$ | $N_3=1.62003$ | $V_3=56.2$ |
| $R_5=+39.5077$ | $s_2=34.5098$ to $4.5098$ | | |
| $R_6=+43.8437$ | $t_4=7.4236$ | $N_4=1.54877$ | $V_4=52.3$ |
| $R_7=-43.8437$ | $s_3=4.5098$ to $34.5098$ | | |
| $R_8=-39.5077$ | $t_5=2.0162$ | $N_5=1.62003$ | $V_5=56.2$ |
| $R_9=+60$ | $s_4=38.8617$ to $8.8617$ | | |
| $R_{10}=+118.376$ | $t_6=4.8$ | $N_6=1.51461$ | $V_6=54.3$ |
| $R_{11}=-31.81$ | $t_7=1.9$ | $N_7=1.64808$ | $V_7=34$ |
| $R_{12}=-86.76$ | $s_5=0.5$ | | |
| $R_{13}=+30.5503$ | $t_7=2.7227$ | $N_8=1.60574$ | $V_8=44$ |
| $R_{14}=+176.735$ | $s_6=11.2745$ | | |
| $R_{15}=-18.6757$ | $t_8=2.9095$ | $N_9=1.71105$ | $V_9=30$ |
| $R_{16}=+22.3672$ | $t_9=7.0011$ | $N_{10}=1.54094$ | $V_{10}=48$ |
| $R_{17}=-19.1848$ | $s_7=0.7274$ | | |
| $R_{18}=+50.0079$ | $t_{10}=4.1825$ | $N_{11}=1.65878$ | $V_{11}=51.1$ |
| $R_{19}=-50.0079$ | | | |

References Cited in the file of this patent

UNITED STATES PATENTS

| | | |
|---|---|---|
| 2,165,341 | Capstaff et al. | July 11, 1939 |
| 2,235,364 | Gramatzki | Mar. 8, 1941 |
| 2,454,686 | Back | Nov. 23, 1948 |
| 2,566,485 | Cuvillier | Sept. 4, 1951 |
| 2,649,025 | Cook | Aug. 18, 1953 |

FOREIGN PATENTS

| | | |
|---|---|---|
| 1,060,514 | France | Nov. 18, 1953 |